Jan. 14, 1941.     M. L. BENJAMIN     2,228,685
CHUCK
Filed July 29, 1939
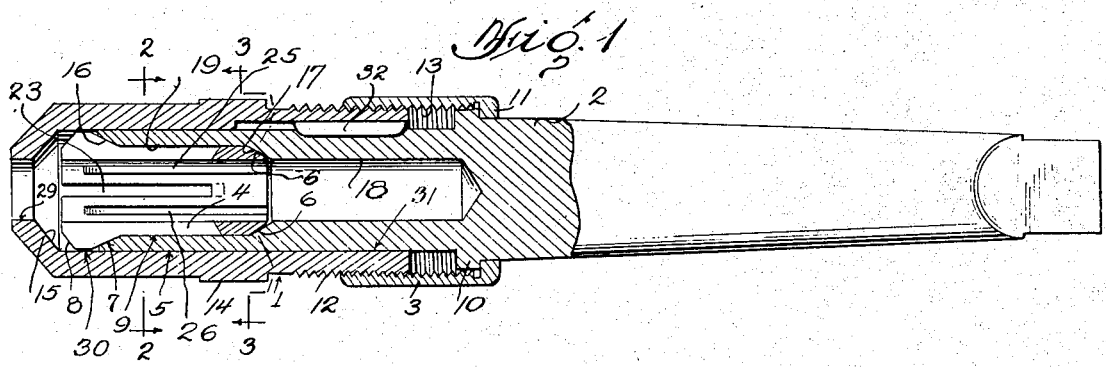
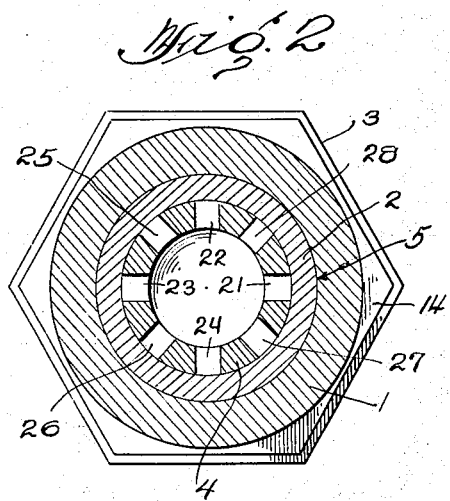
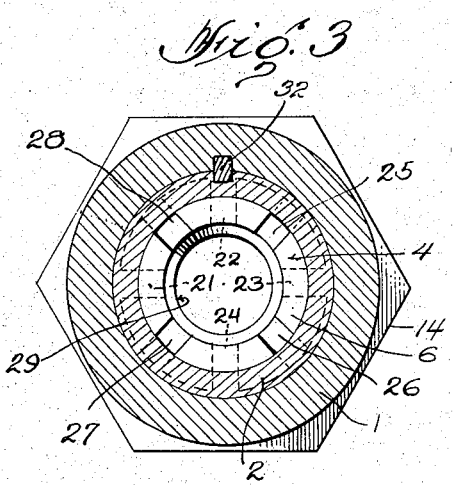
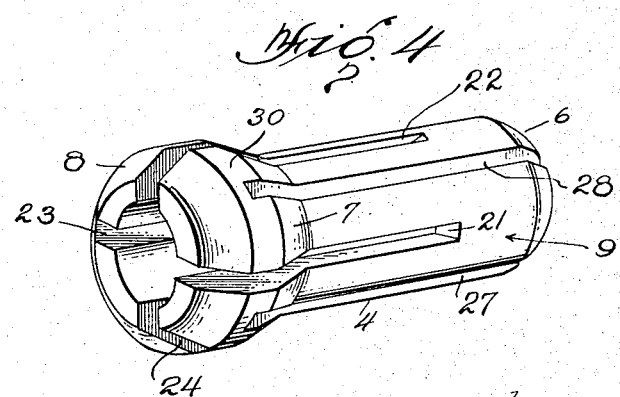
Inventor
Milton L. Benjamin Patented Jan. 14, 1941

2,228,685

UNITED STATES PATENT OFFICE 2,228,685

CHUCK

Milton L. Benjamin, Cleveland, Ohio

Application July 29, 1939, Serial No. 287,392

7 Claims. (Cl. 279—49)

This invention relating as indicated to a chuck is more particularly directed to a collet chuck adapted to grip a tool, bar or similar article.

The general object of the invention is to provide a collet chuck which is expansible and contractible so as to secure a tool or the like to a rotatable shaft or arbor.

It is one object of the invention to positively eliminate any twisting action between the collet and the nose piece in that type of chuck where axial movement of the nose piece causes radial movement of the collet member. Heretofore in chucks of this type the nose piece has generally been rotated and this in turn causes twisting of the gripping collet.

In the present invention any tendency to twist is avoided since it is not necessary to rotate the nose piece in order to move it axially or longitudinally.

It is another object of the invention to maintain accurate alinement at all times between the nose piece, shank and collet and this is accomplished by providing long bearing surfaces upon each of said members. In this way the collet is maintained in accurate alinement originally and throughout all of its movements, both radial and/or longitudinal.

It is another object of the invention to eliminate screw threaded connections as much as possible between the collet, shank and nose piece and it will be seen as the description proceeds that I employ only one pair of screw threads.

It is still another object of the invention to provide a novel form of collet member which has three cam surfaces or pressure seats, thus insuring uniform radial movement of the collet member as it grips and releases the tool or the like.

It is a still further object of the invention to eliminate all complicated mechanism at the nose portion of the chuck, it being a particular object to dispense with screw threads immediately adjacent such forward portion.

Another object of the invention is to provide a chuck of the collet type which is capable of collapsing to a diameter of one-sixteenth of an inch and wherein the interior surface or bore of the collet is held true throughout such collapsing movement.

Another object of the invention is to provide a chuck which is rapidly and easily assembled inasmuch as assembly of the present chuck involves only three movements, namely, insertion of the collet into the bore of the shank, insertion of the shank into the bore of the nose piece and rotation of a coupling member.

Lastly, it is an object of the invention to provide a chuck which is extremely inexpensive to manufacture as the various parts can be made from ordinary stock and no innovation in manufacturing equipment is necessary.

To the accomplishment of the foregoing and related ends, said invention, then, consists of the means hereinafter fully described and particularly pointed out in the claims; the annexed drawing and the following description setting forth in detail certain mechanism constituting, however, but one of various applications of the principles of my invention.

In the accompanying drawing:

Fig. 1 is a side elevation with parts in section.

Fig. 2 is a vertical section taken on the line 2—2 of Fig. 1.

Fig. 3 is a section taken on the irregular section 3—3 of Fig. 1.

Fig. 4 is a perspective view of the collet member.

Referring now to the drawing and more particularly to Fig. 1, it will be seen that my chuck comprises a shank member 2 having a bore 19 at its outer end within which a collet member 4 is slidably received. A nose piece 1 is slidably received upon the outer surface of the shank 2 and this nose piece is provided with a relatively long bearing surface 31 adapted to engage the relatively long bearing surface 5 on the shank so that such nose piece is held in positive alinement at all times. The shank is provided with an outwardly extending shoulder 10 which is adapted to engage an inwardly extending flange 11 on coupling 3. The nose piece 1 is provided with screw threads 12 which engage screw threads 13 on the coupling 3 and as such coupling is rotated, longitudinal movement is imparted to the nose piece 1.

The nose piece 1 is also provided with a surface 14 in the form of a hexagonal nut so that the same may be gripped as the coupling is rotated.

The collet member is shown in Fig. 4 and comprises a relatively long cylindrical or bearing surface 9 and a relatively short bearing surface 30, there being a cam surface or pressure seat 7 joining such bearing surfaces. One end 6 of the collet is beveled at an angle approximately the same as the angle of the cam surface 7. The opposite end 8 of the collet is beveled similar to the beveled end or flaring surface 15 in the interior of the nose piece 1. Slots 21, 22, 23 and 24 extend inwardly from the cam surface 8 and terminate short of the cam surface 6. Slots 25, 26, 27 and 28 extend reversely from the cam surface 6 and alternately with respect to the slots 21, 22, 23 and 24. The collet is held in original alinement by pressure between bearing surface 9 and interior bearing surface 19 on the shank member as well as pressure between bearing surface 30 and the interior bearing surface 31 on the nose piece member. In this manner the collet is maintained in accurate alinement regardless of its axial position. Stated in other words, it may be said that the collet remains accurately alined whether it is totally within the bore 19 or whether it is positioned outwardly as far as it will travel.

As stated previously, the cam surface or pressure seat 8 engages the cam or pressure surface 15 on the nose piece 1 and similarly the cam sursurface 7 on the shank 2 and in addition the cam surface 6 engages the cam surface 17 on the shank member 2. Obviously when this engagement takes place the bearing surfaces 9 and 30 leave the bearing surfaces 19 and 31, respectively. The collet, however, will remain in accurate alinement due to the provision of the three cam surfaces and the collet will contract evenly throughout its length so that an extremely long, uniform grip is obtained upon the tool.

A key 32 may be used if it is desired to positively prohibit rotational movement of the nose piece 1. This key is received in suitable recesses in the shank 2 and nose piece or, if preferred, may be made integral with the shank. The key and keyways naturally add to the cost of manufacture and may be omitted if desired.

In operation, a tool is inserted through opening 29 in the forward end of nose piece 1 and it may or may not extend into the bore 18 of shank 2. The nose piece is then forced to the right as viewed in Fig. 1 after which the coupling member 3 is rotated, causing the longitudinal movement of the nose piece. As the nose piece 1 moves to the right the collet is contracted as explained above, and the tool is securely gripped. It will be noted that the collet is not twisted since the nose piece may be held by gripping the hex surface 14 as the coupling is rotated.

It will also be seen that the collet is maintained in accurate alinement originally as well as throughout its total path of travel, both radial and/or longitudinal.

In addition it will be seen that no complicated parts are present and that the entire device may be rapidly and easily assembled. It is of particular importance to note that extremely long bearing surfaces are provided between the nose piece and the shank member thus preventing radial movement of the nose piece.

It is also important to note that the collet member and interior of the shank are provided with relatively long cooperating bearing surfaces which aid in maintaining accurate alinement. These surfaces however need not be precision ground as are the bearing surfaces on the shank and nose piece because the conical cam surfaces are accurately ground.

The long surfaces have a further function in that all looseness is entirely eliminated and in this connection it should be observed that there are no parts in my chuck which may be broken off or easily lost as the entire mechanism is wholly devoid of any projecting pieces. It will be noted that the three point suspension of the collet insures constant accuracy whereas two point suspension will not give constant accuracy.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In a chuck the combination of a shank member, a nose piece member, a collet member and a coupling member, said collet having three axially spaced, conical cam surfaces, said nose piece having one interior, conical cam surface engaging one of said three cam surfaces on said collet, and said shank having two internal conical cam surfaces engaging the remaining cam surfaces on said collet, the axial distance between the cam surfaces on said shank being substantially equal to the axial distance between said remaining cam surfaces on said collet.

2. In a chuck the combination of a shank member, a nose piece member, a collet member and a coupling member, said collet having three axially spaced, conical cam surfaces, said nose piece having one interior, conical cam surface engaging one of said three cam surfaces on said collet, and said shank having two internal conical cam surfaces engaging the remaining cam surfaces on said collet, the conical cam surfaces on said shank member being substantially parallel and spaced axially from each other a distance that is substantially equal to the axial distance between said remaining cam surfaces on said collet.

3. In a chuck the combination of a shank member, a nose piece member, a collet member and a coupling member, said collet having three axially spaced, conical cam surfaces, said nose piece having one interior, conical cam surface engaging one of said three cam surfaces on said collet, and said shank having two internal conical cam surfaces engaging the remaining cam surfaces on said collet, the conical cam surfaces on said shank member being substantially parallel and flaring outwardly from the axis of said chuck, the interior, conical cam surface on said nose piece flaring in an opposite direction, the axial distance between the cam surfaces on said shank being substantially equal to the axial distance between said remaining cam surfaces on said collet.

4. In a chuck, a collet having axially spaced cylindrical surfaces and a cam surface, said cam surface joining said spaced cylindrical surfaces, and both of the ends of said cylindrical surfaces, remote from said cam surface, being provided with additional cam surfaces.

5. In a chuck, a collet having axially spaced cylindrical surfaces and a cam surface, said cam surface joining said spaced cylindrical surfaces, said cylindrical surfaces having different diameters, one of said cylindrical surfaces being substantially greater in axial extent than the other, said collet having radial slots at each end and cam surfaces at each end.

6. In a chuck the combination of a shank member, a nose piece member, a collet member and a coupling member, said nose piece member surrounding a substantial axially extending portion of said shank member and being movable axially with respect to said shank member upon rotary movement of said coupling, there being means present to prevent rotational movement of said nose piece, such means including a key and a keyway, said nose piece extending backwardly over said shank for a distance greater than said collet extends into said shank, said collet having three axially spaced, conical cam surfaces, two of which engage cooperate conical surfaces on said shank, the other of which engages a conical cam surface on said nose piece.

7. In a chuck, a collet having axially spaced cylindrical surfaces and a cam surface, said cam surface joining said spaced cylindrical surfaces, and both of the ends of said cylindrical surfaces, remote from said cam surface, being provided with additional cam surfaces, one of said additional cam surfaces being parallel throughout its extent to said first named cam surface.

MILTON L. BENJAMIN.